US009620765B1

(12) United States Patent
Flies

(10) Patent No.: US 9,620,765 B1
(45) Date of Patent: Apr. 11, 2017

(54) BATTERY DISCONNECT DEVICE UTILIZING ORIGINAL SINGLE SEGMENT UNMODIFIED BATTERY GROUND CABLE TO CONNECT/DISCONNECT CURRENT FLOW AT CHASSIS CONNECTION SITE

(71) Applicant: Biliti Corporation, Frontenac, MN (US)

(72) Inventor: William Paul Flies, Frontenac, MN (US)

(73) Assignee: Biliti Corporation, Frontenac, MN (US)

( * ) Notice: Subject to any disclaimer, the term of this patent is extended or adjusted under 35 U.S.C. 154(b) by 0 days.

(21) Appl. No.: 14/266,180

(22) Filed: Apr. 30, 2014

Related U.S. Application Data

(60) Provisional application No. 61/854,697, filed on Apr. 30, 2013.

(51) Int. Cl.
*H01M 14/00* (2006.01)
*H01M 2/34* (2006.01)

(52) U.S. Cl.
CPC .......... *H01M 2/34* (2013.01); *H01M 2220/20* (2013.01)

(58) Field of Classification Search
CPC ..................................................... H01M 14/00
USPC ............................................................. 429/7
See application file for complete search history.

(56) References Cited

U.S. PATENT DOCUMENTS 5,066,905 A * 11/1991 Betton ................. G01R 19/145
200/317
5,184,023 A * 2/1993 Carlo ...................... B60R 25/04
307/10.3

* cited by examiner

*Primary Examiner* — Gary Harris
(74) *Attorney, Agent, or Firm* — Vidas Arrett & Steinkraus

(57) ABSTRACT

The invention is an equipment or vehicle battery circuit cutoff device that mounts at the battery chassis ground mounting hole and accepts the original (in place) battery ground cable (single cable) to provide a secure electrical connection in the use configuration (HOT) and a simple quick, safe, and absolute change of state to the electrical cutoff configuration (CUT). The device employs a heavy compression spring that clamps the battery ground cable into the device when compression spring tension is released against the cable end and allows the quick release of the ground cable when a threaded stud knob or a lever assembly lifts the spring tension to allow the ground cable to be quickly removed. There is no internal switch in the device; the only switch being the presence (HOT) or absence (CUT) of the ground cable in the cutoff device insertion slot. Maximum current flow is supported with this design since the cable is locked against a heavy copper bar in the closed circuit state (HOT) so that the current flow is limited only by the capacity of the cable rather than the configuration of internal cutoff switch contacts. The cable clamping force in the closed circuit (HOT) position is constant and resistant to equipment vibration since the clamping force is derived from a high force (40 foot pounds or greater) compression spring rather than a bolt which may vibrate loose and/or may not have been adequately tightened by the equipment operator.

9 Claims, 12 Drawing Sheets

BATTERY DISCONNECT DEVICE UTILIZING ORIGINAL SINGLE SEGMENT UNMODIFIED BATTERY GROUND CABLE TO CONNECT/DISCONNECT CURRENT FLOW AT CHASSIS CONNECTION SITE

CROSS-REFERENCE TO RELATED APPLICATIONS

This application is a continuation of application No. 61/854,697, filed Apr. 30, 2013, the entire contents of which are hereby incorporated by reference.

STATEMENT REGARDING FEDERALLY SPONSORED RESEARCH

Not applicable.

BACKGROUND OF THE INVENTION

Field of Invention

The invention is related to a battery cutoff device. More specifically the invention provides a secure attachment of an equipment battery circuit ground cable to the chassis of its host equipment. The secure attachment can readily cutoff the battery circuit (see FIGS. 8 and 9) (stop current flow) without the use of any tools and that assures an absolute cutoff since the path of current flow back to the storage battery, the ground cable, is removed from its chassis connection.

Description of Prior Art

Two basic types of battery cutoff devices or master switches have existed since the use of electrical storage batteries in equipment. One type is mounted on the battery as shown in FIGS. 1-3. This type of cutoff device terminates flow from the storage battery's positive electrical post by opening the cutoff device's switch mechanism. This type of cutoff does not require an additional cable since the device mounts to the battery and the original positive current cable mounts to the cutoff device.

The second type of cutoff device is mounted inline in the storage battery's positive electrical circuitry. Since this is an inline device, it requires a new second cable to continue the electrical circuit (see FIGS. 4-7). This type of device can be mounted anywhere in the electrical circuit but is usually mounted in a circuit location that allows both the battery current and an alternator or generator current to be cut from equipment. As such, the device acts as a "kill" switch or emergency cutoff device.

Many equipment configurations, especially those configurations that operate in dirty or wet environments, secure their battery (batteries) in battery cases:

(1) to mechanically secure the batteries;

(2) to reduce environmental intrusions (rain, grease, dust, chaff, etc.), and (3) to reduce the chance of shorts and electrical fires.

Because the batteries are enclosed in these cases, the type of cutoff devices that connect directly to the battery cannot be used because they do not fit in the battery case. Further, when the cutoff device is in a battery case, access to the cutoff device is made more difficult and the equipment operator is less likely to cutoff the circuit when the equipment is shut down for an extended period. Although this type of cutoff device is the most economical (no additional cable is required), it cannot be used on equipment where battery post access is difficult.

The inline switch type of cutoff device are more costly than the battery mount devices because they require a second cable to connect to their second port and because they usually have to be panel mounted for access to and operation of their switch mechanism. Because of this cost increase, they are used only in expensive equipment applications and those applications that require circuit cutoffs during equipment operation (kill switch).

Both types of cutoff devices have internal switch mechanisms that switch current flow states (On or Off). As equipment engine power has increased and engine compression has increased, more storage battery current flow is required to start those engines. The relatively small switch contacts in these devices limits the amount of current flow to the electrical circuits regardless of the current carrying capability of the cables. These devices use a threaded contact screw or a two state leaf switch, both of which can vibrate to either state (on or off) when the equipment is in use.

BRIEF SUMMARY OF THE INVENTION

The primary objectives of the invention are to provide an economical, absolute connection, absolute cutoff, high current battery circuit cutoff device that is easy to use (no tools) to facilitate the cutoff of the circuit when the equipment will not be used for an extended period (end of season, storage, not in use) which will increase the life of the storage battery, reduce degradation of circuit components, and reduce the chance of equipment electrical shorts and fires. The invention's economics are supported by the fact that it does not require any new or additional cables since it mounts in the original ground cable chassis mounting hole and accepts the end connector of the existing ground cable. The invention provides an absolute full time circuit connection in the closed state due to its high force compression spring. The compression spring closure is immune to equipment vibration. Its closure pressure is not dependent on operator tightening action. The invention provides an absolute and obvious circuit cutoff in the open state because the ground cable which is the path of all electrical flow back to the storage battery is physically removed from the circuit. In the closed state, the invention provides high current flow support via a heavy copper bus bar. This bus bar provides more connection to the chassis than the original ground cable connector and concurrently provides a copper to copper connection across the entire surface of the ground cable connector to the bus bar. Current flow is not limited by the size and configuration of an internal cutoff device switch because there is no internal switch. The invention is easy to use since an integral threaded stud knob or lever mechanism allows the equipment operator to quickly change the state of the cutoff without the need for any tools. Because of this ease of use and because of the device state assurance (hot or cut), the equipment operator is more apt to cutoff the circuit when the equipment is shut down for an extended period.

BRIEF DESCRIPTION OF THE SEVERAL VIEWS OF THE DRAWINGS

In the following, the present invention is explained in more detail by means of the attached drawings of examples of realization. In the drawings show.

DETAILED DESCRIPTION OF THE INVENTION

Figure 1:
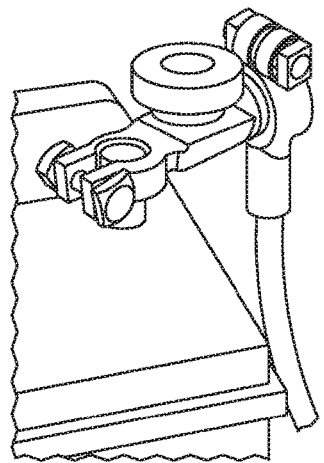
FIG. 1 shows a prior art two storage battery post mount cutoff device application. A cutoff device bolts to a side post storage battery positive terminal (not the ground terminal) in place of the original positive cable. The positive cable is, in turn, bolted to the opposite end of the cutoff device. The green knob in the center of the device is the cutoff switch that is tightened to close the circuit and loosened to cut the circuit. The connection is made via a strip of metal under the turn knob.
Figure 2:
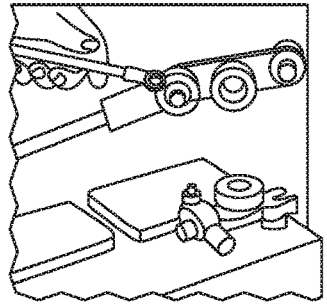
FIG. 2 shows a cutoff device for a top post battery. The device mounts to the positive post of the battery and the original cable connects to the cylindrical end of the cutoff device. As with the side post application, the green knob in the center of the device is tightened to close the circuit and loosened to open or cutoff the circuit. These cutoff devices require that the cable connection of the cutoff device be suspended in air since the cable connection end cannot touch the chassis or equipment metal or the circuit could not opened (cut).
Figure 3:
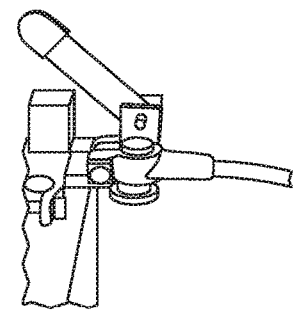
FIG. 3 is a battery post mounted cutoff device design that uses a handle and "U" terminal (called a knife switch) to close the circuit. The cutoff device mounts to the positive battery terminal and the original positive cable connects to the cutoff device post. The circuit is cutoff when the handle is out of the "U" connector and closed when inserted into the "U" connector. Although the principle of the device is similar to those shown in FIG. 4.0, this design can handle more current due to the heavier gauge handle and "U" connector material. Again, however, it is too large to fit into and operate in an enclosed battery case.
Figure 4:
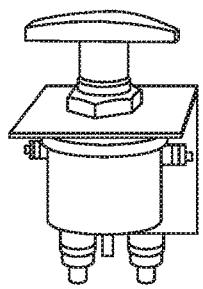
FIG. 4 illustrates an inline cutoff device. An existing positive side conductor (cable or wire) is connected to one of the device's terminals and a new second cable or wire is connected from the device's other terminal to the connection point that the original wire or cable was connected. A handle, knob, key, or lever on the cutoff device is turned or lifted to open and close the circuit. This device needs to be mounted in a panel to hold the terminals away from chassis contact (would be a short) and to facilitate operation of the knob or key. This device has an internal switch similar to those described in FIG. 1.
Figure 5:
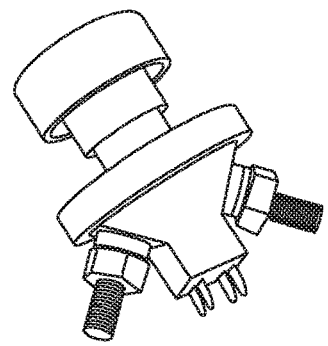
FIG. 5 shows another inline cutoff device that has additional connections to cutoff the alternator current or generator current in addition to the battery current. Again this device needs to be panel mounted to operate the lever. Internal switching is similar to devices described in FIG. 1 and FIG. 4.
Figure 6:
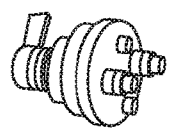
FIG. 6 presents the typical panel mount trim panel and lever needed to operate an inline cutoff device.
Figure 7:
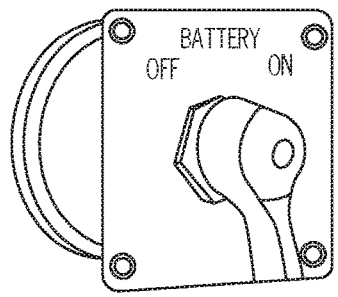
FIG. 7 is a simple schematic showing the placement of an inline cutoff device (kill switch) when it needs to cutoff power from both the storage battery and the alternator (Alt) or generator. Although the configuration allows the engine to be killed (shutdown), some electrical devices (e.g. starter as in this diagram) are still connected to the battery and to chassis ground so current flow continues.
Figure 8:
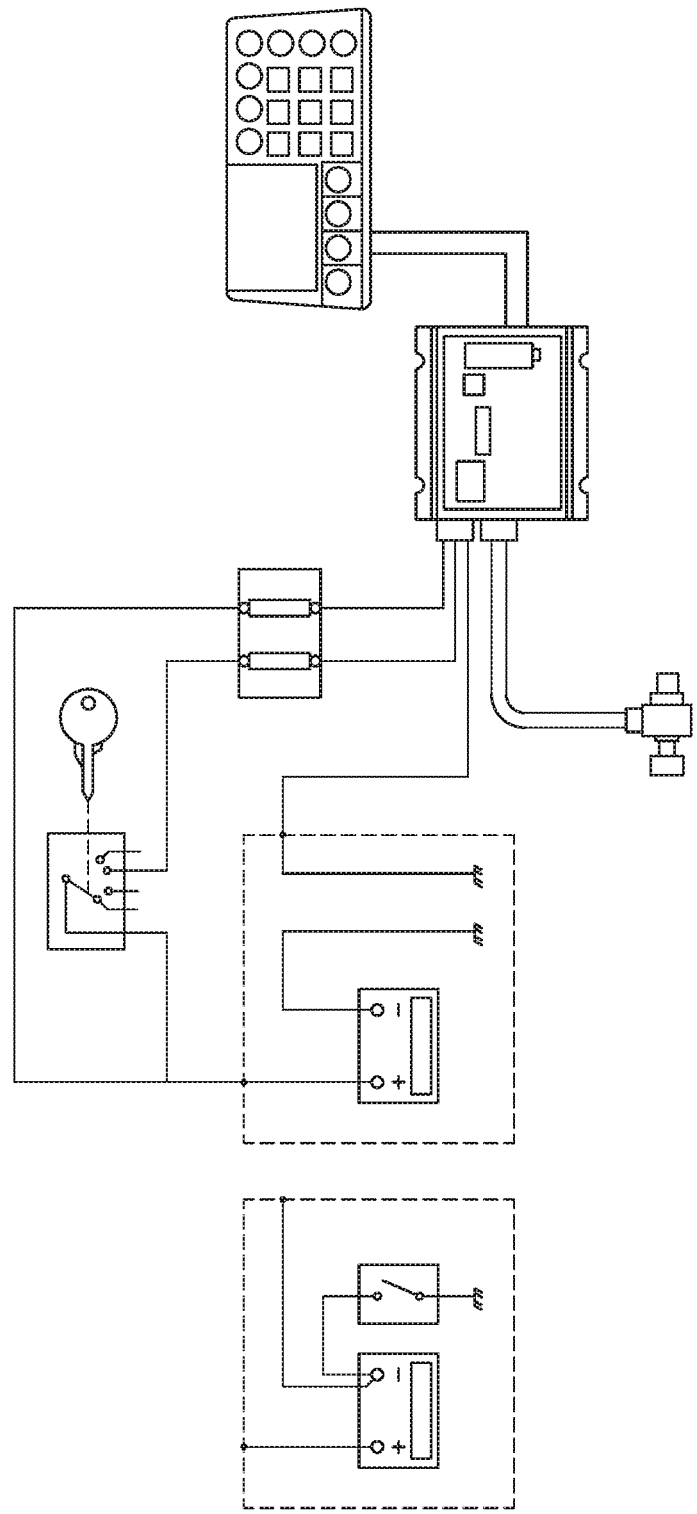
FIG. 8 is a typical equipment electrical system schematic that employs a storage battery from which current flows from its positive post through the equipment electrical circuit and back to the storage battery via a chassis ground connection. All circuit devices are connected to the positive side for inbound current and to the equipment chassis for current flow to a battery ground cable and then back to the storage battery.
Figure 9:
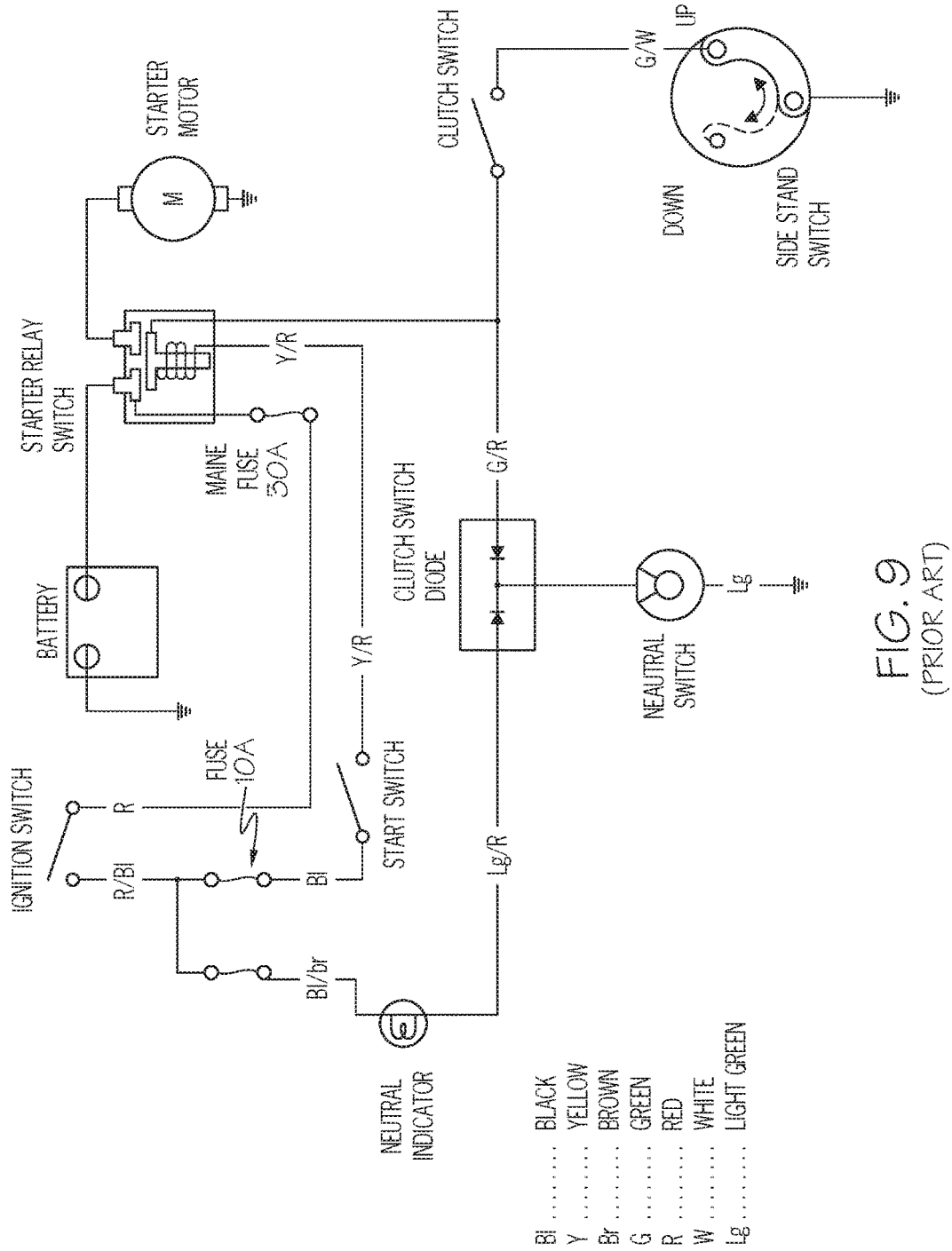
FIG. 9 is a more complex equipment electrical system schematic with inline switches, fuses, and more devices.
Figure 12:
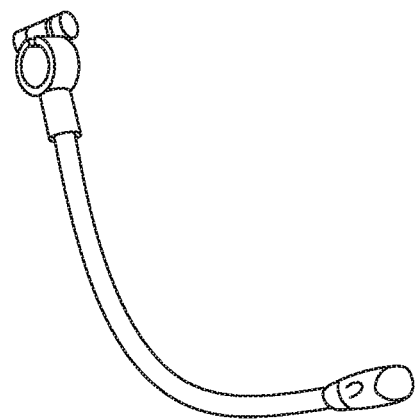
FIG. 12 is a typical ground cable that connects to the ground terminal on the storage battery on one end and to the chassis of the vehicle or equipment on the other end. This specific cable is for top post batteries. The side post battery ground cable has identical connections on each end that are similar to the chassis connection end shown here. The chassis end of a typical ground cable is constructed of high grade copper to maximize current flow. The hole bolts the cable to the equipment chassis. The cable diameter and cable end size determines the amount of current to be carried.
Figure 11:
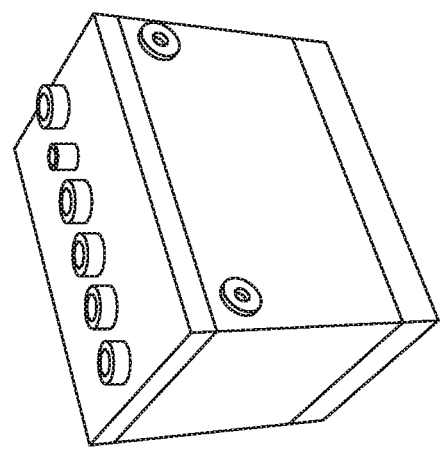
FIG. 11 is a side post storage battery typically used in the newer automobile applications.
Figure 10:
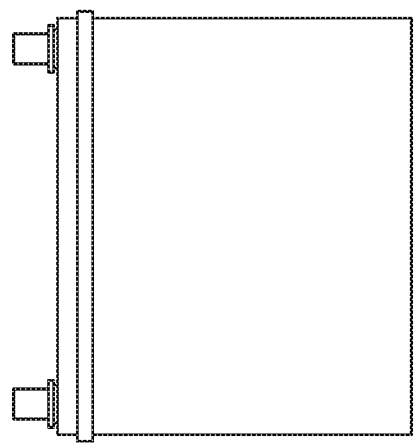
FIG. 10 is a top post storage battery typically used in automobiles, farm equipment, boats, and most vehicles with internal combustion engines.
Figure 13:
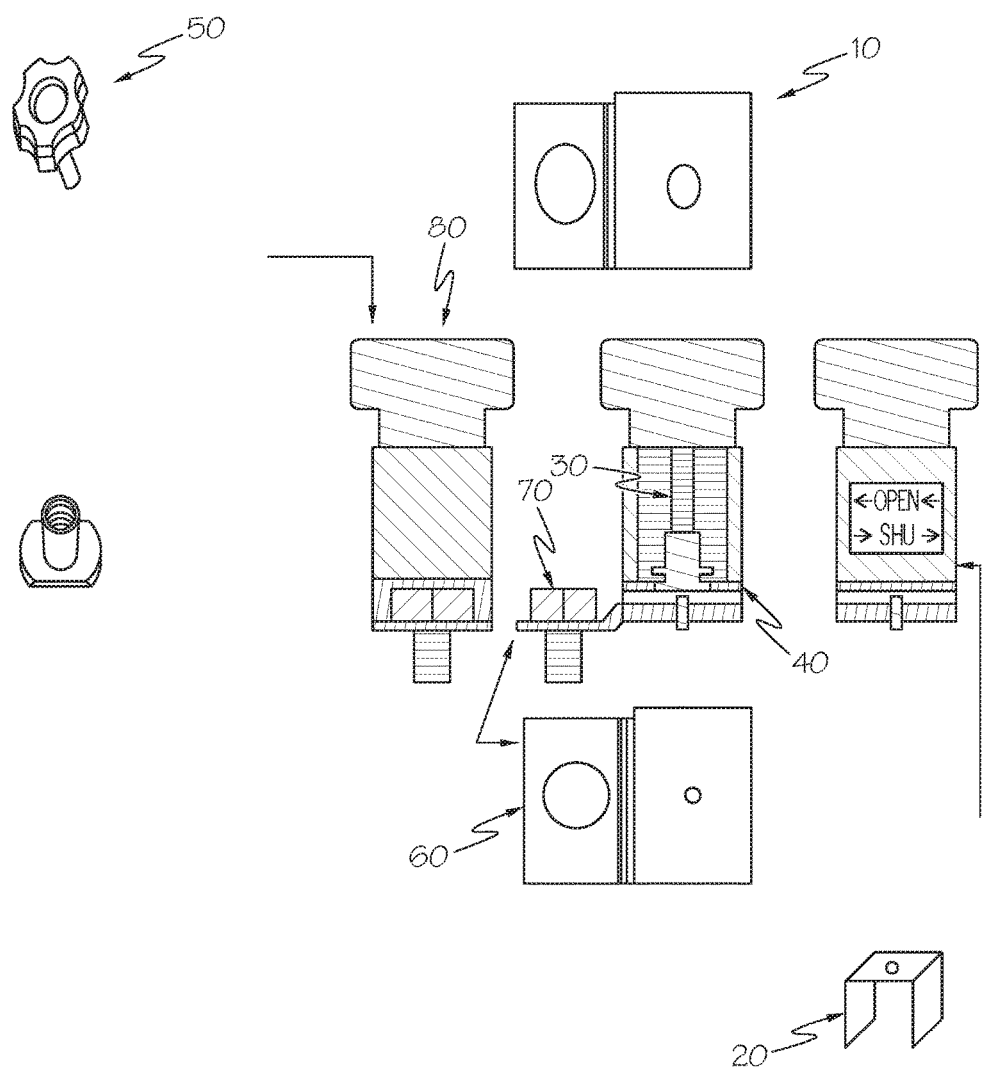
FIG. 13 is an exploded view of the invention, a battery circuit cutoff device.
Figure 14:
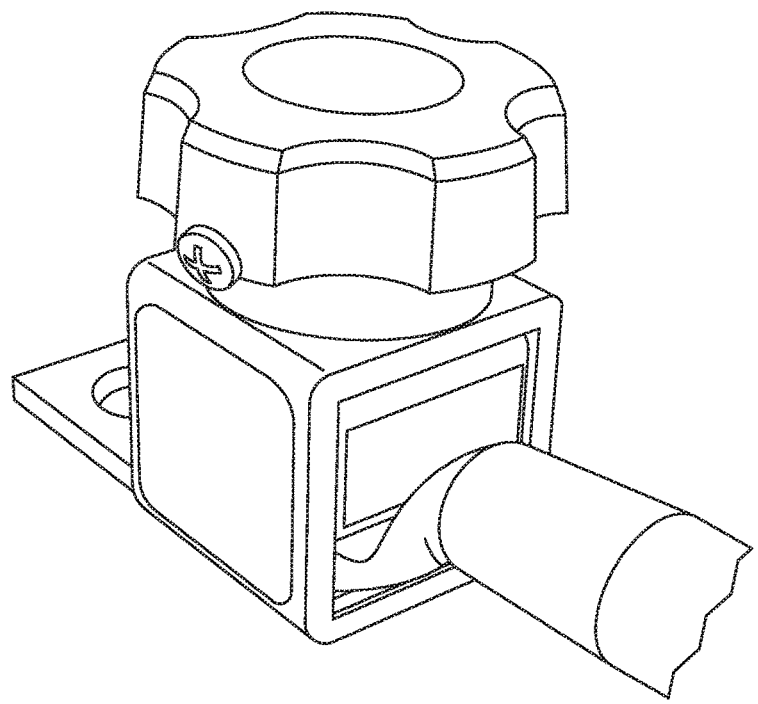
FIG. 14 shows the invention with the ground cable inserted and locked into the invention to close the circuit.
Figure 15:
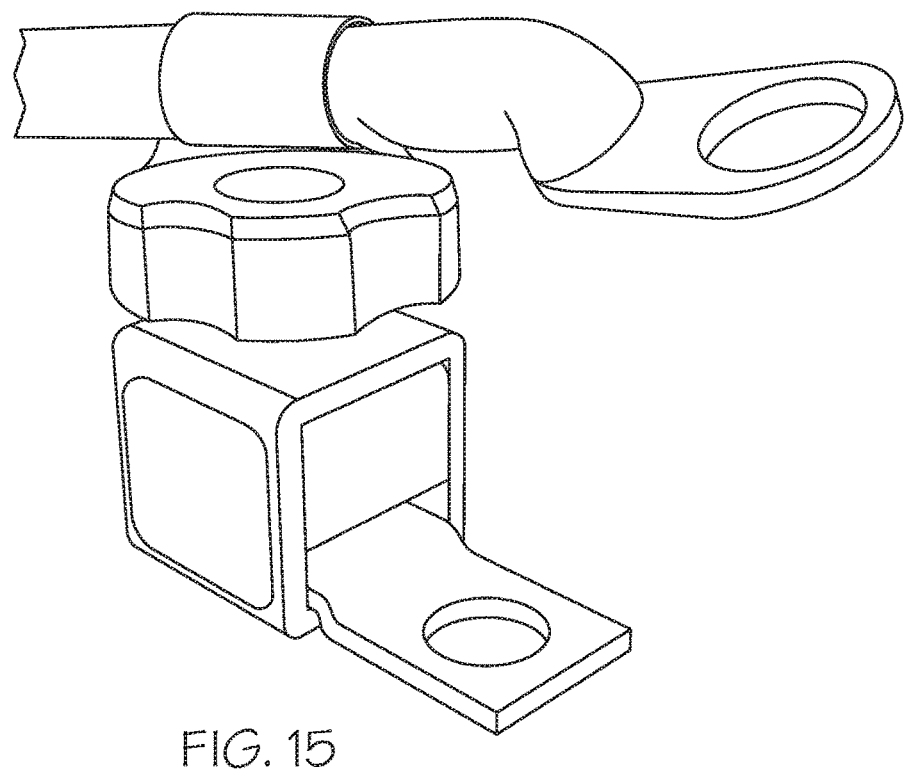
FIG. 15 shows the invention with the ground cable not inserted, and attached to the Velcro top, with the circuit open.

While this invention may be embodied in many different forms, there are described in detail herein a specific preferred embodiment of the invention. This description is an exemplification of the principles of the invention and is not intended to limit the invention to the particular embodiment illustrated.

A housing (10) and capsule cover (20) encloses a compression spring (30) and lift pad (40) mechanism that is lifted and lowered by either a threaded stud knob (50) or a lift lever (not shown in this drawing). A heavy copper bus bar (60) is internally attached to the housing and extends along the entire lower inside surface of the housing. It is secured to the housing with a threaded screw. The entire cutoff device bolts to the equipment's chassis using the original chassis ground bolt (70). A Velcro patch (80) on top of the dielectric knob or lever "hooks" to a compatible Velcro strip on the ground cable when it is out of the device and the circuit is in the open state (cut). This keeps the ground cable away from the chassis when disconnected so there is no storage battery drain.

The invention is a storage battery cutoff device that is mounted on the chassis of equipment and accepts the original ground cable into a cable insertion slot where it is locked by a compression spring thus closing the equipment's electrical circuit. The device does not require an additional cable; only the original ground cable. It mounts on the chassis and does not mount on the storage battery itself so the battery case does not have to be opened to operate the device. The invention requires no tools to open and close the battery circuit; just the turning of a knob or pushing of a level. When the ground cable is removed from the invention, a Velcro strip on the cable is secured (hooked) on a Velcro patch located on the insulated knob so there is no chance of current flow.

To install the invention, the ground cable is disconnected from the equipment chassis and the invention is mounted in its place using the same chassis mounting hole and bolt. Then, the original ground cable chassis connection end is inserted into the opposite side of the invention, the knob is turned to release the compression spring, and the ground cable is locked into the invention. The electrical circuit is now closed (HOT). To cutoff the circuit, the knob is turned to lift (compress) the compression spring and the ground cable is removed and "hooked" to the insulated knob. The electrical circuit is now open (CUT). Extra weight in one node or quadrant of the lift knob (see screw in a node of the knob) discourages the knob from turning by equipment vibration when the device is mounted in a horizontal position (knob not up). This extra weight is attained by the existence of the screw and, for extra weight, lead or other heavy metal can be secured by the screw near the outside edge of the knob.

The hole shown on the left end of the invention is located over the chassis ground hole formerly occupied by the ground cable and the invention is bolted to the chassis by ground bolt 70. The housing 10 of the invention is made of a dielectric plastic material with properties which are immune to the potential heat generated by a high current flow. The large copper bus bar surface of the invention that is pressed against the chassis provides a much greater current flow connection than did the original cable end.

The knob 50 on top of the device lifts a compression spring 30 and lift pad 40 which opens an insertion slot. The ground cable end is inserted between the invention's bus bar and the lift pad, the knob is turned to lower the compression spring and the ground cable is locked between the lift pad and the copper bus bar by the pressure of the compression spring.

The lift pad 40 is raised to provide space for cable insertion. In the production device, the compression spring is enclosed except for the insertion slot. It should be understood that the lift pad 40 can be made of copper or a dielectric plastic material.

Figure 16:
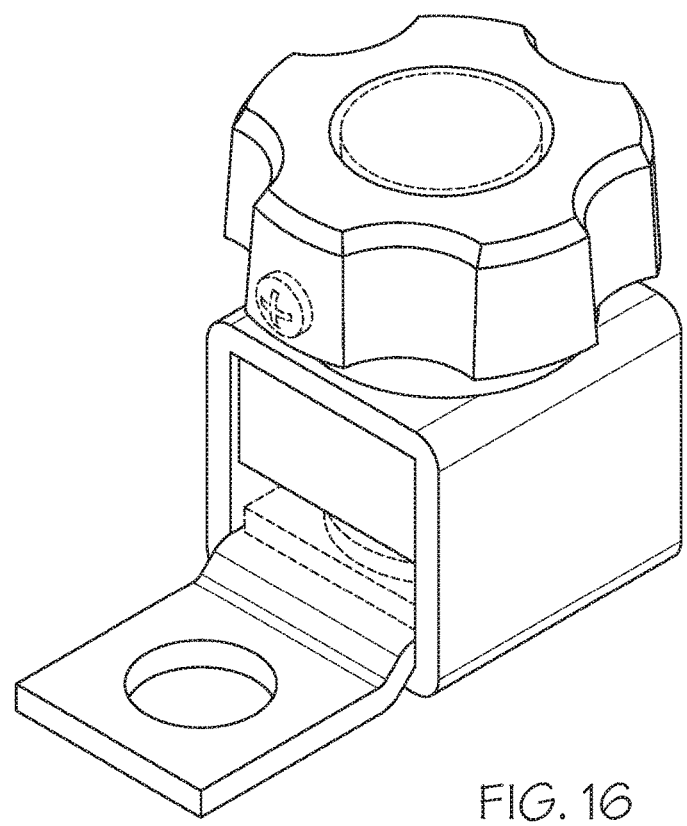
FIG. 16 shows a perspective view of the top, right and front sides of the invention.
Figure 17:
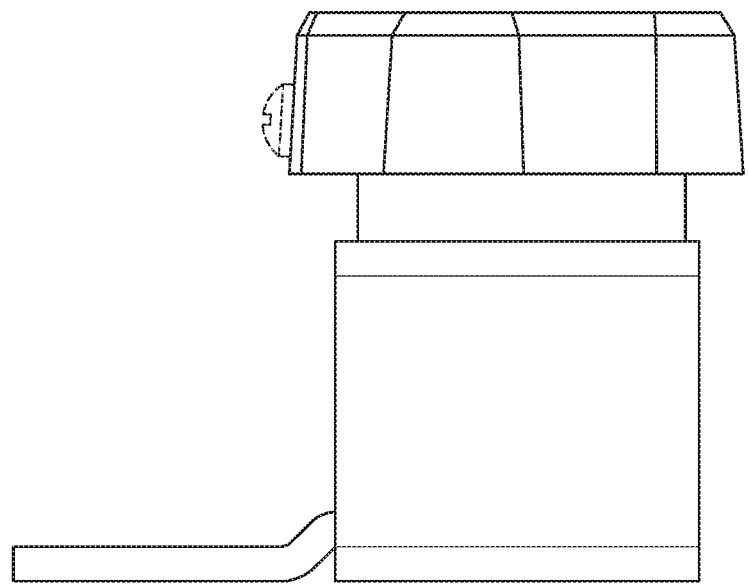
FIG. 17 shows the right side of the invention.
Figure 18:
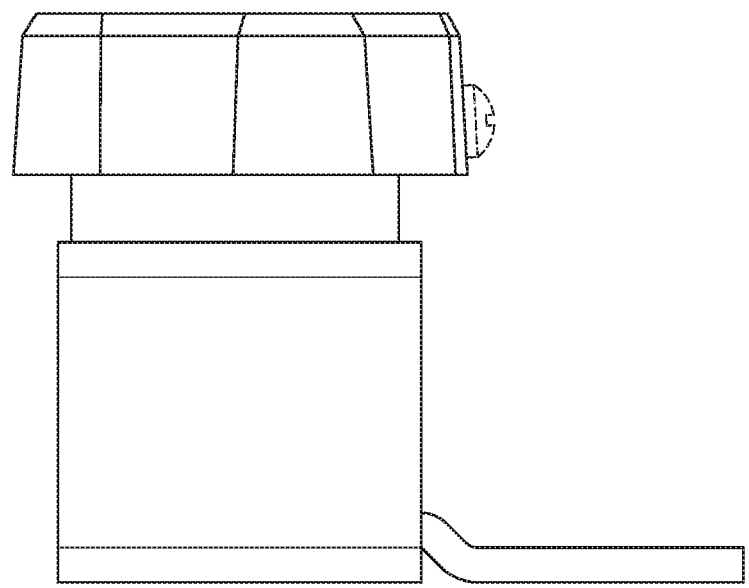
FIG. 18 shows the left side of the invention.
Figure 19:
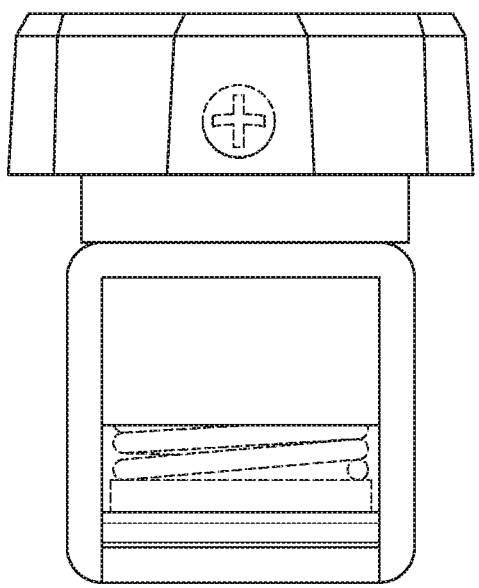
FIG. 19 shows the front side of the invention with the compression spring in the closed position (pressure position).
Figure 20:
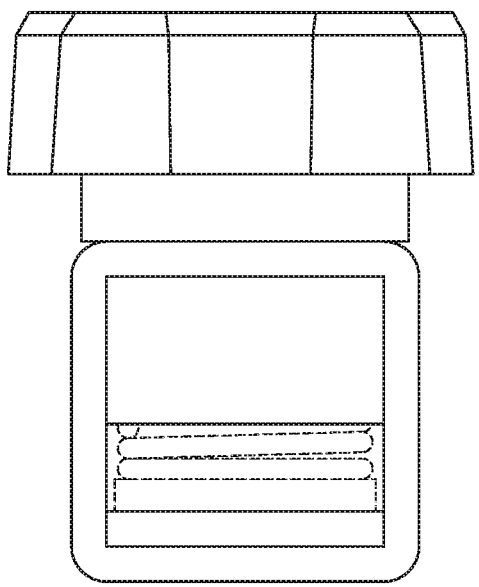
FIG. 20 shows the back side of the invention with the compression spring in the closed position (pressure position).
Figure 21:
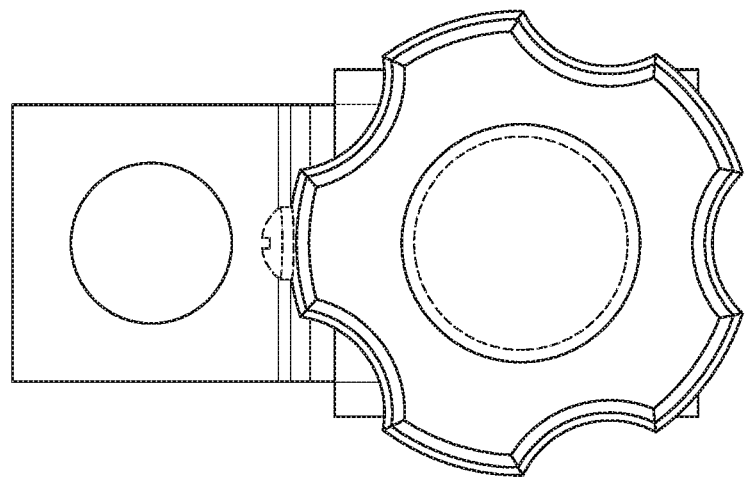
FIG. 21 shows the top side of the invention.
Figure 22:
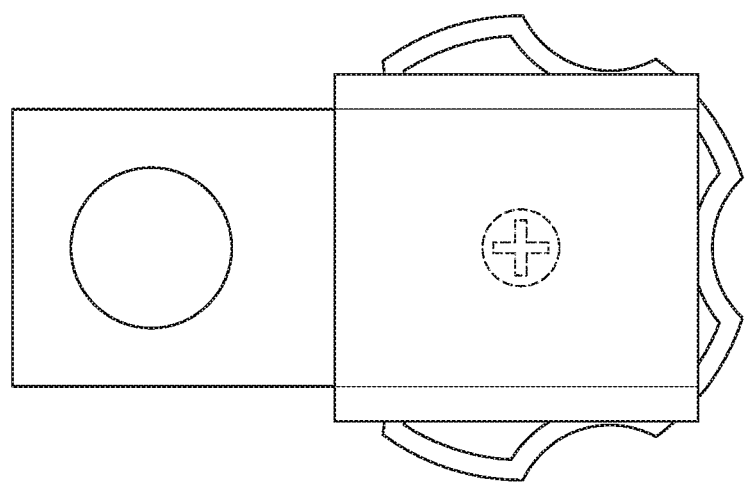
FIG. 22 shows the bottom of the invention.
Figure 23:
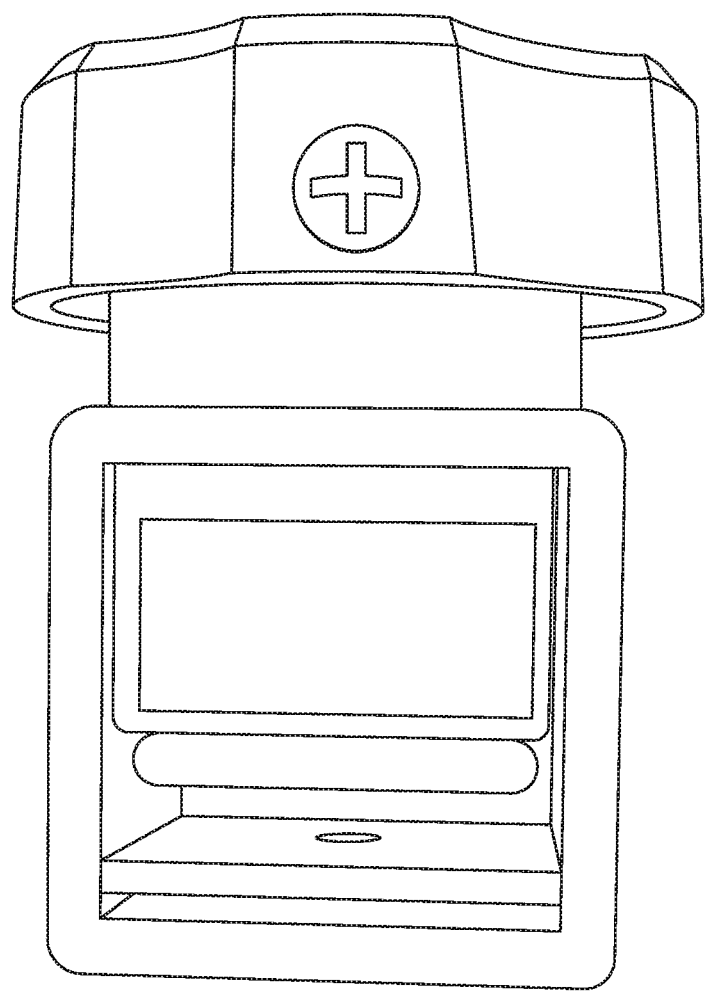
FIG. 23 that shows the front side of the invention with the compression spring in the compressed position (open position).
Figure 24:
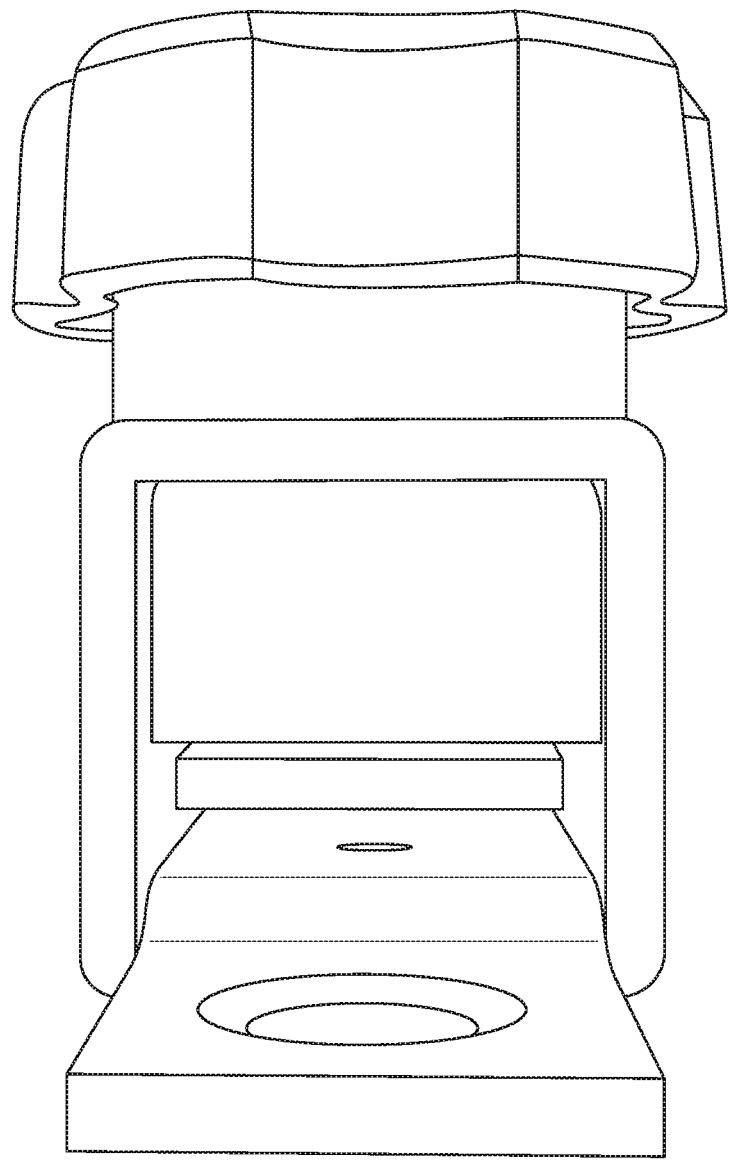
FIG. 24 that shows the back side of the invention with the compression spring in the compressed position (open position).

The invention shown in the figures is a "cube" shape design. The ornamental appearance of the invention is shown in FIGS. 16-24.

Other shape designs with a spring locking mechanism and a protruding copper bus bar can also be used. The figures show a knob to turn a threaded stud (bolt) that lifts and lowers the compression spring and lift pad thus opening the cable insertion slot. However, a lever could be used in place of the knob to lift and lower the compression spring and lift pad.

Regardless of the invention physical configuration, the important features are the placement of the cutoff device at the chassis end of the ground cable whereas all other cutoff devices are located on the positive side of the storage battery, the use of a compression spring to provide a constant connection force that is immune to equipment vibration and operator tightening variations, the positive open and close of the circuit by the complete removal of the ground cable from the circuit (no switches), and the increased current carrying capability due to elimination of small switch contact points.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A storage battery cutoff device comprising:
a housing with an opening for the chassis mounting end of an unmodified original ground cable of a battery;
a copper bus bar within the housing attached to a chassis of a vehicle;
the housing having an attachment device with an open state and a closed state, the closed state securely attaching the unmodified original ground cable between a lift pad and the copper bus bar to provide maximum current flow from the unmodified original ground cable through the copper bus bar;
in the open state the unmodified original ground cable is not in contact with the copper bus bar.

2. The storage battery cutoff device of claim 1 wherein the attachment device is further comprised of a compression spring contained in the housing, the compression spring resting on a lifting pad comprised of copper or plastic, which is operatively connected to a lift knob, attached to a top of the housing, such that when the knob is loosened, the lift pad lowers towards the copper bus bar to securely lock the ground cable between the lift pad and the copper bus bar.

3. The storage battery cutoff device of claim 2 wherein the lift knob has a piece of Velcro attached to its top portion, so that the ground cable, which also has a piece of Velcro secured to it, can be fastened to the top of the knob when the attachment device is in the open state.

4. The storage battery cutoff device of claim 1 wherein the opening in the housing is an insertion slot.

5. The storage battery cutoff device of claim 1 which is attached to the chassis of the vehicle at the site formerly occupied by the chassis end of the storage battery ground cable and wherein the opening provides an insertion slot to receive the original ground cable chassis mounting end and lock the cable into position that closes the circuit.

6. The storage battery cutoff device of claim 1, wherein the ground cable secure and connection configuration is comprised of an upper piece and a lower piece, and wherein the lower piece is comprised of a copper bus bar securely attached to the housing and that connects to the equipment chassis, a compression spring that can be raised and lowered by a threaded stud on a knob that is attached to the lift pad, the lift pad comprising either a threaded copper pad or a plastic pad with metal thread insert that connected to the compression spring, the lift pad and the copper bus bar together provide an insertion slot which forms the opening of the housing, for the chassis end of the original ground cable and which lift pad and compression spring can be lowered to compress the chassis end of the original ground cable unto the copper bus bar to close the equipment's electrical circuit.

7. The storage battery cutoff device of claim 6 which utilizes the presence or absence of the ground cable as a switch.

8. The storage battery cutoff device of claim 7, further including a Velcro patch located on the knob unto which a Velcro strip on the chassis end of the ground cable can be placed or hooked when the circuit is open, to prevent the ground cable from inadvertently touching the chassis and closing the circuit.

9. The storage battery cutoff device of claim 6, wherein the copper bus bar has a chassis mounting hole.

\* \* \* \* \*